United States Patent [19]
Pele et al.

[11] Patent Number: 5,161,001
[45] Date of Patent: Nov. 3, 1992

[54] METHOD FOR SUB-SAMPLING IN THE AXIS OF MOTION OF A SEQUENCE OF ELECTRONIC PICTURES

[75] Inventors: Daniele Pele; Bruno Choquet, both of Rennes, France

[73] Assignees: Centre National d'Etudes des Telecommunications, Issy les Moulineaux; Telediffusion de France, Montrouge Cedex, both of France

[21] Appl. No.: 282,451

[22] Filed: Dec. 9, 1988

[30] Foreign Application Priority Data

Dec. 16, 1987 [FR] France .................. 87 17602

[51] Int. Cl.$^5$ ............................. H04N 7/12
[52] U.S. Cl. .................. 358/138; 358/105; 358/133; 358/136
[58] Field of Search ........... 358/138, 136, 135, 133, 358/21 V, 12, 141, 105, 53, 214

[56] References Cited

U.S. PATENT DOCUMENTS 3,715,483  2/1973  Limb et al. ............... 358/105
4,622,578  11/1986  Rzeszewski ............... 358/12

FOREIGN PATENT DOCUMENTS

WO87/05770  9/1987  PCT Int'l Appl.

OTHER PUBLICATIONS

Huang et al.;"Image Sequence Analysis"; Springer Series in Information Sciences, vol. 5, (Springer-Verlag Berlin, Heidelberg, New York 1981), pp.1-17.

Primary Examiner—Edward L. Coles, Sr.
Assistant Examiner—Thomas D. Lee
Attorney, Agent, or Firm—Locke Reynolds

[57] ABSTRACT

Disclosed is a method to achieve a sub-sampling of pictures, making it possible to optimize the spatial and temporal definition of the compressed signal, so as to enable a most faithful possible reconstruction of the picture received with said compressed picture signal and, if necessary, with complementary assistance data. A field of speed vectors is defined for at least each picture to be sub-sampled, and said pictures to be sub-sampled are sub-sampled by eliminating certain picture points, the preserved picture points being chosen so as to avoid selecting a picture point which corresponds spatially to the approximate projection of a source point preserved during the sub-sampling of the preceding sub-sampling picture, said projection resulting from the application, to said source point, of the associated shift vector.

7 Claims, 3 Drawing Sheets

METHOD FOR SUB-SAMPLING IN THE AXIS OF MOTION OF A SEQUENCE OF ELECTRONIC PICTURES

BACKGROUND OF THE INVENTION

1. Field of the Invention

The field of the invention relates to the analysis and the encoding of sequences of electronic pictures and, more particularly, to the sub-sampling of electronic pictures of this type by the selective removal of certain points in the picture or of certain picture frames or complete pictures.

In a specific example, described in detail here below, the method according to the invention can be applied to the sub-sampling of sequences of high definition pictures designed to be transmitted through a limited throughput channel. A preferred application of this type is the transmission of high definition television on MAC channels.

However, the method of the invention can also be used in any system that analyzes a sequence of pictures (robotics, target tracking, searching for spatio-temporal parameters, etc.) or a sequence of sets of data (in medical or meteorological applications, etc.).

For the application and transmission of HDTV on MAC channels, the prevailing standards that must be met consist in the compression of the HDTV picture signal in the form of a standard TV picture signal, either according to European standards or according to American and Japanese standards.

The transmission standards are shown in table 1.

TABLE 1

| | European TV and HDTV standards | | | |
|---|---|---|---|---|
| | HDTV | TV | Compression | |
| vertical definition | 1250 lines | 625 lines | 2:1 | Total 4:1 |
| horizontal definition | 1440 points or 1920 points | 720 points 960 points | 2:1 | |
| | if HDTV source 1250/1440/50/1:1 (non-interlaced): compression rate 8:1 | | | |

The result thereof is that any sampling procedure should be capable of providing a compression rate of either 1:4 or 1:8, depending on whether the HD picture source is interlaced or non-interlaced respectively.

2. Description of the Prior Art

There are already various, known sub-sampling methods providing for a compression rate of this type.

The prior art examples given below correspond to methods for the sub-sampling of non-interlaced pictures. These methods have also been adapted to interlaced pictures.

A first known sub-sampling method is the Japanese "Muse" method called the "non-stable quincunxial line" method. This method consists in doing a sampling operation on four pictures, the picture 1 being sampled at the points 1 and 3 and the picture 3 being sampled at the points 2 and 4 (FIG. 1). The pictures 2 and 4 are reconstructed in the decoder by using a temporal interpolation method.

The advantage of this method is that good samples are obtained, but it requires high quality picture sequences. The result thereof, moreover, is diminishing of the spatial resolution of the transmitted signal.

A second known method, called the "field skip" method, consists in the systematic elimination of every other frame and in the sampling, at the same lines, of each kept frame (FIG. 2) but in quincunxial form. This method results in a loss of half of the vertical definition.

A third prior art method, developed after the Muse system, consists in doing a sampling operation on four frames, in systematically eliminating the frames 3 and 4. Referring to the depiction of FIG. 1, the method consists in sampling the frame 1, at 1 and 3, and the frame 2, at 2 and 4. This method has the drawback of requiring a temporal management of the sampling memory with a buffer memory arrangement, because the samples 3 are sampled, in time, before the samples 2, but must then be transmitted after these samples 2, during the third frame signal.

In short, the prior art methods disadvantage either spatial resolution (in the Muse method) or temporal resolution, or again, they reduce vertical resolution by half (as in the field skip method).

Furthermore, there is another known system for video signal compression, such as the one described in the patent document PCT-A-8 705 000 (British Broadcasting Corporation) proposing the use of motion vectors defined on the picture to achieve the compression processing with a view to improving the sub-sampling of moving picture zones. The proposed sampling structure is chiefly of structure of the line quincunx type, distributed on each frame of successive sets of four frames. The sampling mask for the sampled frames, from the second frame of each set onwards, is shifted as a function of information on motion vectors, so as to sample picture points complementary to those sampled in the first frame, to maximize the amount of information transmitted and, hence, the picture definition.

However, the principle of the British invention has the drawback of making the sampling structure take the motion vector module entirely into account. This calls for setting up complex systems requiring high consumption in data processing to handle motion vector modules. The complexity further increases for reconstructions implying the temporary storage of the first frames in the sets of four frames, for picture reconstruction.

OBJECTS OF THE INVENTION

An object of the invention, in particular, is to overcome all these drawbacks.

More precisely, a first object of the invention is to achieve sub-sampling of the pictures so as to optimize the spatial and temporal resolution of the compressed signal in order to provide for the most faithful possible reconstruction of the picture received, using said compressed picture signal and, if necessary, additional assistance data.

A second object of the invention is to maximize the information transmitted in the compressed signal, by striving at each instant to refresh the earliest transmitted picture points of the moving objects.

Another essential object of the invention is to provide for a sub-sampling system which takes into account picture point motion in the picture plane to maximize the quantity of information transmitted without having to manage the repercussion of the entire motion vector module on the sampling structure.

A complementary object of the invention is to provide a sub-sampling method enabling reconstruction of an picture having the same quality as the source picture. Thus, preferably, the sub-sampling method should enable the reconstruction of a non-interlaced picture signal from a non-interlaced source signal and an interlaced picture from an interlaced source picture.

Another object of the invention is to give a picture signal sub-sampling method which is, in particular, compatible with the method for adaptive refreshing by vector quantification proposed in the French patent application No. 86 17 715 of Dec. 17, 1986 and/or with the multi-predictive method for estimating the motion of the points of an electronic picture, proposed in the co-pending French patent application No. 87 17 601 filed on Dec. 16, 1987, on behalf of the same applicant.

SUMMARY OF THE INVENTION

These objects, as well as others which will appear subsequently, are achieved by means of a method for the sub-sampling of a picture signal or of picture zones belonging to a sequence of electronic pictures, in order to obtain a compression of said signal, said method being of the type which consists in the determination of a field of speed vectors for each picture to be sub-sampled, in associating a shift speed vector in the picture plane with each of the points of said picture, and in eliminating certain pictures in the sequence and/or certain picture points in the sub-sampled pictures, depending on the shifting speeds of the points so as to maximize the quantity of data transmitted under the constraint of a given maximum throughput rate, a method wherein the sub-sampling structure consists in applying, to each picture or picture zone, a sub-sampling mask capable of taking two distinct positions, and wherein the position of the sampling mask is chosen so as to avoid the selection, for each current picture, of that position, of said two positions, which would amount to a selection of picture points corresponding spatially to the approximate projection of the source points preserved during the sub-sampling of the previous sub-sampled picture, said projection resulting from the application, to each of the said source points, of the associated shift vector.

In this way, by choosing an adequate, quincunxial sampling structure, the repetitiveness of the sampling structure makes it possible to concentrate only on the parity of the vector values and not on their entire module.

In a preferred embodiment of the invention, the elimination of said picture points is done by the systematic elimination of all the even-parity lines and all the odd-parity lines of the picture in the case of a non-interlaced signal.

In another preferred embodiment, adapted to an interlaced signal, either the even-parity frame or the odd-parity frame is eliminated depending on the parity of the speed vector.

Advantageously, the sub-sampled pictures also undergo horizontal compression, preferably by the elimination of even-parity columns or odd-parity columns, the parity of the eliminated columns, for each picture, being such that said eliminated columns approximately correspond, spatially, to the projection of the columns preserved in the previous sub-sampled picture, said projection resulting from the application, to the points of said columns of the previous source picture, of associated speed vectors.

Preferably, and in the case of the application of the sub-sampling method of the invention to the compression of a HDTV signal in an MAC channel (with a compression rate of 1:4 or 1:8), the pictures, picture frames, respectively, of the sequence are sub-sampled in packets of four successive pictures, picture frames, with the elimination of two pictures, picture frames within each packet.

In the case of a non-interlaced picture, firstly, for each first sub-sampled picture of the packet, either the even-parity lines or the odd-parity lines are eliminated and, secondly, for the second sub-sampled picture of said packet, those lines are systematically eliminated which have a parity such that they approximately correspond spatially to the projection of the set of lines preserved in said first sub-sampled picture of the packet.

In the case of an interlaced picture signal, each first frame within each packet is systematically preserved, and a choice is made to eliminate either the second frame or the third frame of the packet so as to eliminate that frame which has a parity such that it approximately corresponds spatially to the projection of said first sub-sampled frame, said projection resulting from the application, to the points of said sub-sampled first frame, of the associated speed vectors.

BRIEF DESCRIPTION OF THE DRAWINGS

Other features and advantages of the invention will appear from the following description of preferred embodiments of the invention, given by way of illustration, and from the appended figures, of which.

DESCRIPTION OF PREFERRED EMBODIMENTS

The fundamental principle on which the present invention is based is to adapt the sub-sampling structure of the source signal to the motions of the picture points.

The motion of the picture points is estimated, in a known way, by the FOURIER method, the "block matching" method or, again, the method using spatio-temporal gradients (see T. S. Huang, "Image Sequence Analysis: Motion Estimation" in Image Sequence Analysis; Ed. T. S. Huang, Springer Verlag 1981).

It is also possible to use multi-prediction motion estimators and/or motion direction estimators, as described in the co-pending, forementioned patent application, filed on Dec. 16, 1987, on behalf of the same applicants, with the title "Procédéd'estimation multi-prédictif des mouvements des points d'un image éléctronique" (Multi-predictive Method for the Estimation of Motions of the Points of an Electronic Picture).

In the embodiment shown here, the basic goal of the sub-sampling method consists in optimizing the operation to reconstruct the picture from the sub-sampled picture signal received by the decoder. For this embodiment corresponds especially to an element of a chain for the processing of an HD picture signal designed to be transmitted by MAC channels.

The picture reconstruction is achieved advantageously by motion compensation.

Motion compensation is defined by the following procedures:

1) the HD picture, at the instant t, is assumed to be entirely known;

2) the encoder gives the transmission channel pieces of data deduced from a segmentation of the picture with n vectors per zone (n≧1);

3) for real samples received at the instant t+1, one vector is selected from among then candidates;

4) depending on its precision, the precision of the speed vector is improved, at the decoder, by means of an iteration of the motion estimating algorithm (the speed vector selected serves as a predicted value);

5) to each point that has to be compensated for, there is assigned a speed vector which is a (linear) function of the environment;

6) the picture t is projected in t+1 as a function of the speed vectors, and only those points that can be compensated for are retained (these are the points other than those sampled at t+1, generally located at the middle of these points);

7) the remaining points (other than those sampled and compensated for) are interpolated by spatial linear filtering.

Figure 4:
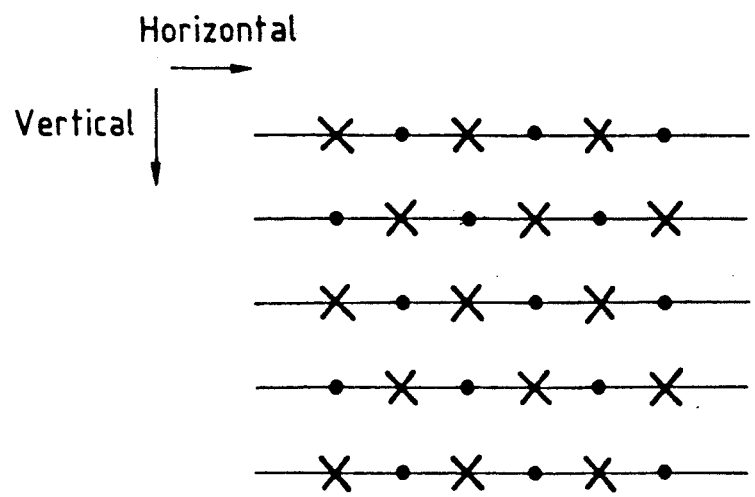
FIG. 4 shows the results of the sub-sampling according to the invention, in the axis of the shift, after the application of the method shown in FIGS. 3A and 3B.

The basic idea of the invention, therefore, is to obtain a final lattice, after compensation, such as is shown in FIG. 4, seen along the axis of the shift. The actually transmitted points correspond to the pixels marked with an X, the intermediate pixels being, for example, reconstructed by spatial interpolation.

A lattice of this type can be obtained by looking along the axis of the shift of the picture points, especially under the following conditions:

preferably, consideration is given to a picture or a picture zone wherein the motions of the picture points are relatively homogeneous (where the same object is being shifted). However, this condition is not imperative: it is also possible to simultaneously process any picture points having the same parity;

a sub-sampling is achieved, according to a data compression rate of 1:4 for the embodiment discussed, i.e. by statistically eliminating every other point in horizontal definition and every other point in vertical definition. Full definition can, however, can be obtained during the reconstruction, from assistance data (for example, estimated speed vector), or by spatial interpolation as already mentioned;

an effort is made to avoid sampling an element which is approximately the projection of an already sampled element in the already sampled picture. For, owing to the use, in a preferred way, of shift speed vectors as assistance data for the reconstruction of pictures, this projected point will be known from the said previously transmitted source element.

Figure 1:
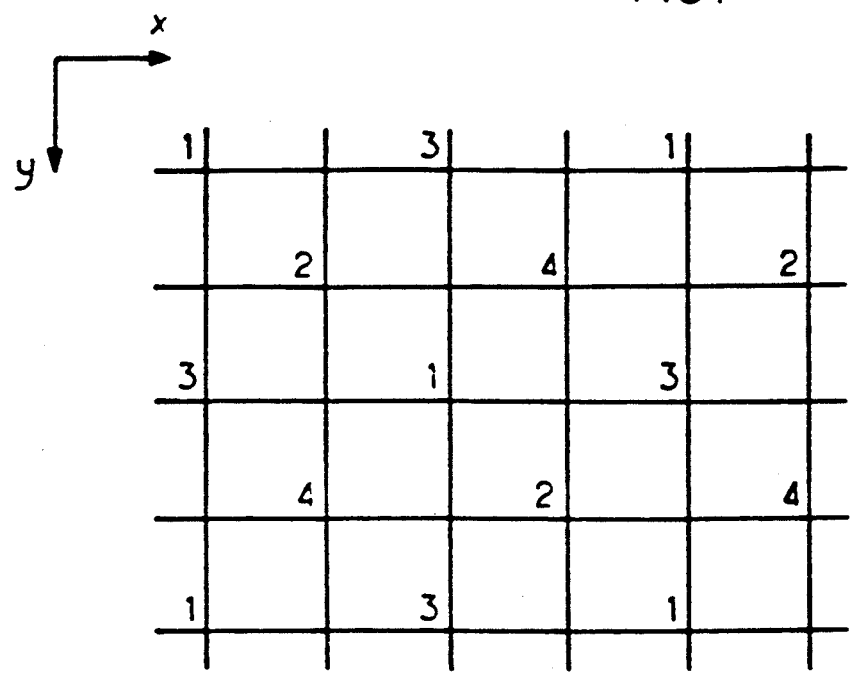
FIG. 1 shows the prior art "non-stable quincunxial line" sub-sampling method.
Figure 2:
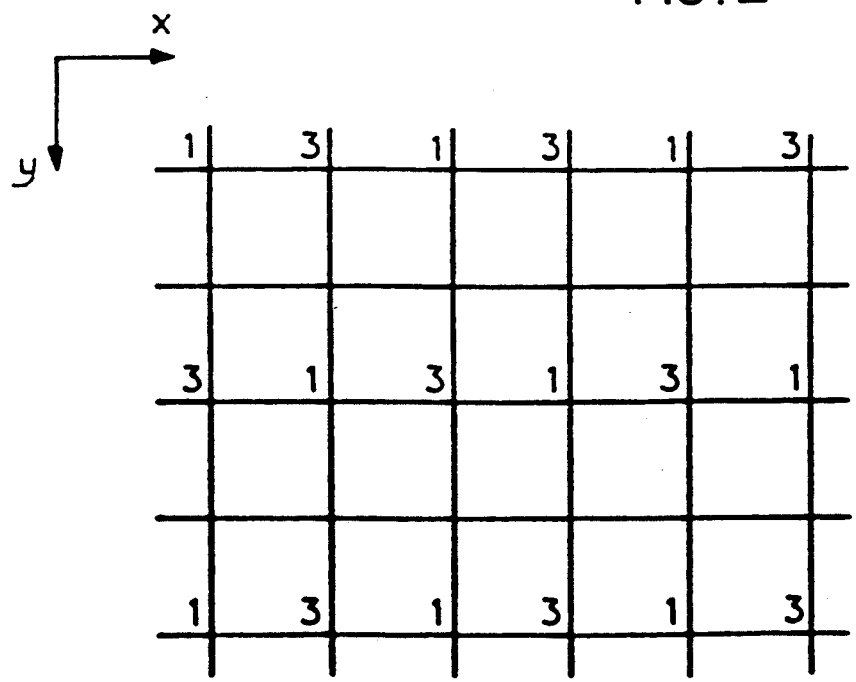
FIG. 2 shows the prior art quincunxial frame skip sub-sampling method.
Figure 3A:
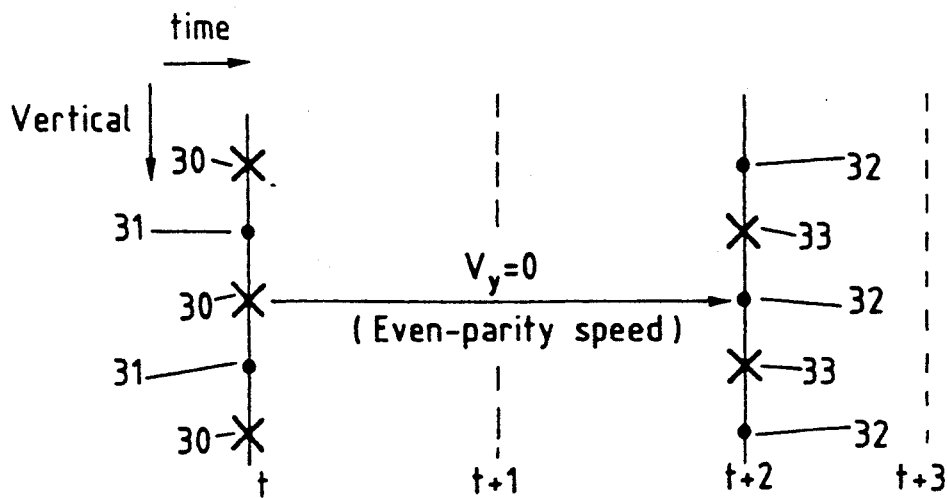
FIGS. 3A and 3B show the sub-sampling method according to the invention, in an example of a non-interlaced picture source, for an even-parity motion vector and an odd-parity motion vector respectively.
Figure 3B:
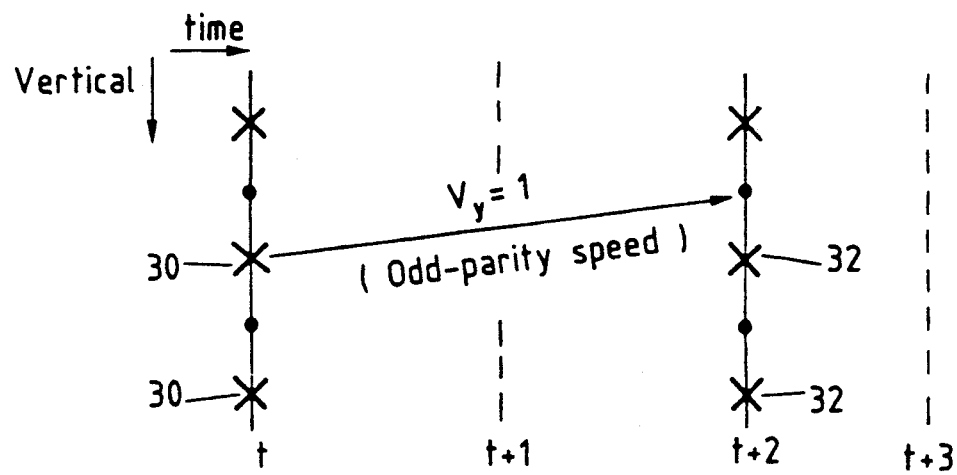

When applying the principle of the invention to the sub-sampling of a non-interlaced picture source, the sub-sampling is preferably done in packets of four successive pictures of the sequence t, t+1, t+2, t+3 (FIG. 3a, 3B).

Two pictures are systematically eliminated from the packet. Advantageously, it will be either the picture t+1 and the picture t+2 or the picture t+2 and the picture t+3 that will be systematically eliminated, depending, for example, on psycho-visual criteria. The first approach, in the case of a non-interlaced signal obtained from an interlaced signal, corresponds more to a sub-sampling of the field skip type while the second approach, in the same case, corresponds to a picture skip type of sub-sampling.

FIGS. 3A and 3B correspond to two examples that may be encountered, depending on the parity of the vertical component of the speed vector $v_y$.

In the case of an even-parity speed vector (here $v_y=0$) shown in FIG. 3A, the picture t+2 will be advantageously sub-sampled by eliminating picture lines 32 approximately corresponding to the projection of the lines 30 transmitted during the sampling of the picture t. For, in doing this, only the lines 33 are retained during the sampling. This makes it possible to know, in the simple example presented, the lines 31 eliminated during the sampling of the picture t. The result thereof is that the picture t+2 may be perfectly reconstructed since the lines 32 will be reconstructed directly from the lines 30 of the picture t, through the knowledge of the speed vector $v_y$ given in the reconstruction assistance data.

Of course, this example is optimized and corresponds to a whole-number value speed vector. In the case of a speed vector with a fractional value, it will be rounded out to the closest whole number value.

The invention 3B illustrates the sub-sampling method of the invention in the example of a non-interlaced picture signal when the speed vector $v_y$ is an odd-parity value.

The reasoning presented above can be applied symmetrically and leads to the conclusion that the sampling of the packet of four pictures can be used to obtain the widest variety of information when the lines 30, 32 of the same rank and the same parity are transmitted both for the picture t and for the picture t+2.

It will be ascertained that the application of this principle, not only in vertical sampling but also in horizontal sampling, can be used to obtain a sampled lattice as shown in FIG. 4, when looking along the axis of the shift.

Figure 5:
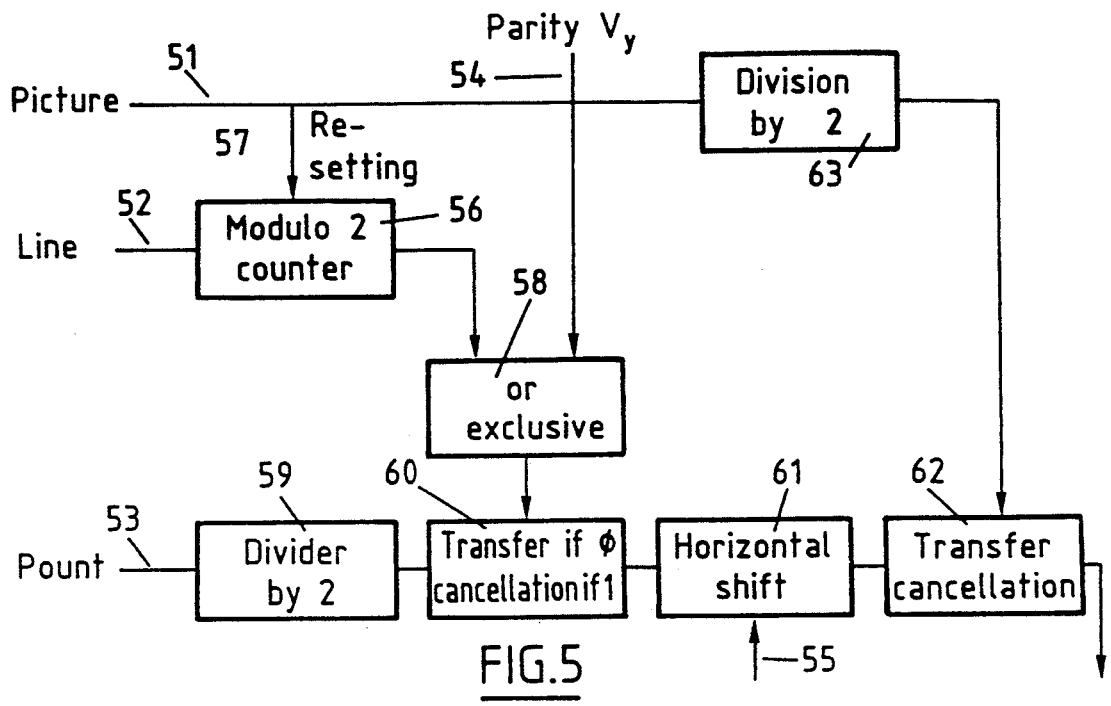
FIG. 5 is a block diagram of an advantageous embodiment for a circuit implementing the sub-sampling method shown in FIGS. 3A, 3B and 4.

The diagram of FIG. 5 is a block diagram of the different circuits which can be used to implement the sampling method of the invention in the case of non-interlaced picture sources.

The circuit has, in input, a picture synchronization signal 51, a line synchronization signal 52, and a point synchronization signal 53. The parity of the vertical component $v_y$ of the speed vector 54 and the horizontal component $v_y$ of 55 are also input data.

The circuit has a modulo 2 counter 56 with a resetting input 57. An OR-exclusive circuit 58 receives, firstly, the value of the parity $v_y$ and, secondly, the output of the counter 56. The output of the OR-exclusive circuit reaches the chain 53, for the processing of information on point synchronization, successively comprising a divider by 2 (59), a circuit 60 for transfer or elimination depending on the value of the output bit of the circuit 58, a horizontal shift circuit 61 receiving the parity information $v_y$ 55 and a second decision circuit 62 providing for the transfer or elimination of the point depending on the information coming, firstly, from the decision circuit 61, and secondly, from a divider circuit 63 of the picture synchronization line 51.

In the case of the sub-sampling of an interlaced picture source signal, the same principle as the one explained above is used to select the transmitted frames.

To preserve the definition, in the case of vertical even-parity motions $v_y$, two successive frames of the source will be transmitted (the horizontal definition is divided by two, after pre-filtering). The frames 3 and 4 of each packet of four frames are interpolated temporally at the decoder, on the basis of digital assistance data advantageously containing a depiction of the associated speed vectors.

To preserve the definition, in the case of odd-parity vertical motions $v_y$, every other frame is transmitted. The temporal reconstruction then concerns solely the two non-transmitted intermediate frames, and is controlled by the received assistance data.

Figure 6:
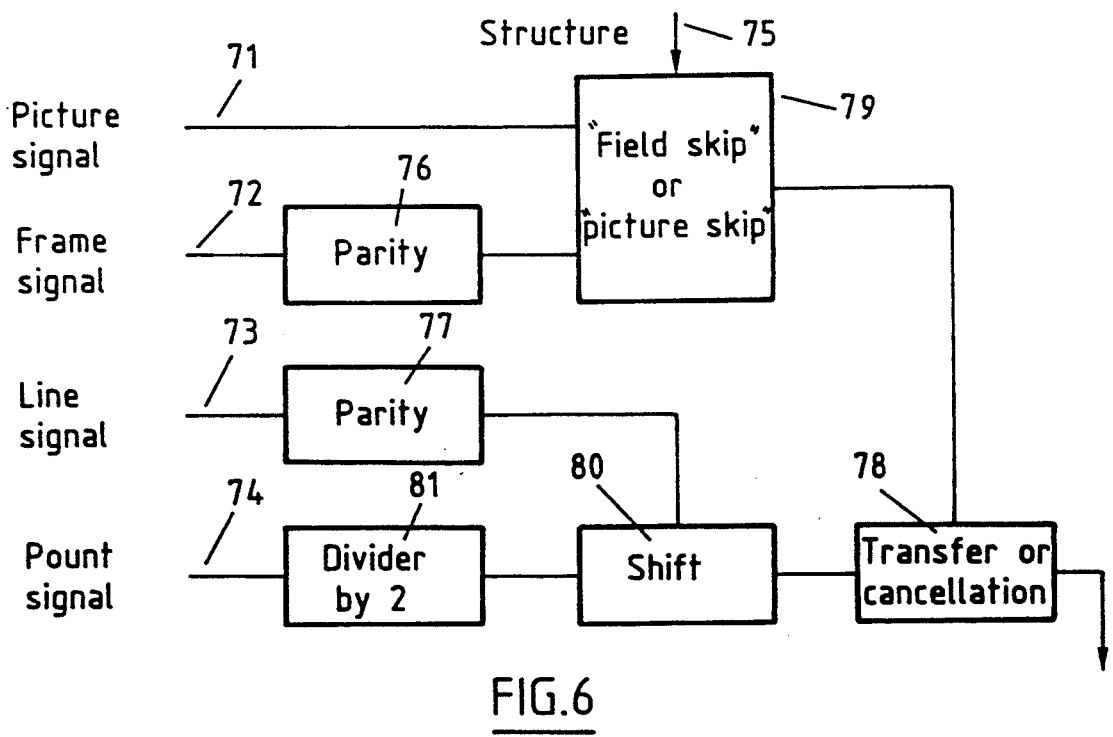
FIG. 6 shows a preferred embodiment of a circuit implementing the sub-sampling method, according to the invention, for a source of interlaced pictures.

The implementing of the method, in the case of an interlaced picture source, can be achieved by means of a circuit such as the one shown in FIG. 6.

This circuit has four input signals: a picture synchronizing signal 71, a frame synchronizing signal 72, a line synchronizing signal 73 and a points synchronizing signal 74.

The signals 72, 73, supply the parity determining circuits 76, 77. The decision to transfer or eliminate a point is then taken by a decision circuit 78 on the basis, firstly, of a piece of information coming from a field skip sampling selection or a picture skip sampling selection circuit 79 and, secondly, from a piece of information of horizontal shift coming from a decision circuit 80 receiving at input, firstly, a piece of information from the line parity circuit 77 and, secondly, from a divider by two circuit 81.

The selection of the skip mode, in the circuit 79, results from the value of the structure information 75 according to the following arrangement:

"frame skip" structure if $v_y$ is an odd-parity value between the frames n and n+1 sampled;

"picture skip" structure if $v_y$ is an even-parity value between the frames n and n+1 sampled.

It can be ascertained that the working of the sub-sampling method employs one and the same principle in the case of an interlaced source and a non-interlaced source. In the practical application, the difference results from the fact that the selection of lines to be sampled is done somewhat spatially, in the case of a non-interlaced source since what has to be done is to eliminate every other line of each picture. By contrast, in the case of an interlaced source, this decision results in the elimination of a full frame since the lines defining one and the same picture are distributed by parity between two adjacent frames.

In the case of an interlaced source, it will be noted that the processing cost with respect to the application of the principle of maximizing the diversity of data sampled in the direction of the motion, according to the invention, will not always be justified for horizontal sampling. If necessary, it is thus possible to do without the decision circuits for elimination of picture points sampled as a function of the parity of the horizontal component of the associated speed vectors.

In a known way, for each mode of application of the method, a 2D spatial prefiltering prevents folds and an identical post-filtering ensures that the decoder will reconstruct the HD picture or frame.

What is claimed is:

1. In a method for sub-sampling a signal representative of a sequence of electronic non-interlaced pictures, including a preceding picture and a current picture, in order to obtain a compression of said signal, each picture of the sequence including at least one picture zone and comprising picture points arranged in sets of even-parity lines and odd-parity lines, said method including for each current picture to be sub-sampled the step of:

selectively eliminating in each of said picture zones one of the sets of lines of picture points, the selection of the set of lines to be eliminated comprising the steps of:

associating with each point of a preceding sub-sampled picture a speed vector, projecting each point of said preceding sub-sampled picture according to the speed vector associated therewith, and selecting one of the sets of lines of picture points of the current picture so as to eliminate picture points approximately corresponding spatially to the projection of points of said preceding sub-sampled picture.

2. In a method for sub-sampling a signal representative of a sequence of electronic interlaced pictures, including a preceding picture and a current picture, in order to obtain a compression of said signal, each picture of the sequence including at least one picture zone and comprising picture points arranged in frames of even-parity lines and odd-parity lines, said method including for each current picture to be sub-sampled the step of:

selectively eliminating in each of said picture zones one of the frames of lines of picture points, the selection of the frame of lines to be eliminated comprising the steps of:

associating with each point of a preceding sub-sampled picture a speed vector, projecting each point of said preceding sub-sampled picture according to the speed vector associated therewith, and selecting one of the frames of lines of picture points of the current picture so as to eliminate picture points approximately corresponding spatially to the projection of points of said preceding sub-sampled picture.

3. In a method for sub-sampling a signal representative of a sequence of electronic pictures structured in columns, including a preceding picture and a current picture, in order to obtain a compression of said signal, each picture of the sequence including at least one picture zone and comprising picture points arranged in sets of even-parity columns and odd-parity columns, said method including for each current picture to be sub-sampled the step of:

selectively eliminating in each of said picture zones one of the sets of columns of picture points, the selection of the set of columns to be eliminated comprising the steps of:

associating with each point of a preceding sub-sampled picture a speed vector, projecting each point of said preceding sub-sampled picture according to the speed vector associated therewith, and selecting one of the sets of columns of picture points of the current picture so as to eliminate picture points approximately corresponding spatially to the projection of points of said preceding sub-sampled picture.

4. A method for sub-sampling a signal representative of a sequence of electronic non-interlaced pictures in order to obtain a compression of said signal, each picture of the sequence comprising picture points arranged in sets of even-parity lines and odd-parity lines, said method comprising the steps of:

grouping said sequence of pictures into packets of four successive pictures, eliminating two pictures while preserving a first picture and a second picture within each packet, eliminating, in said first picture, either the even-parity lines or the odd-parity lines of the picture points, the lines not eliminated constituting retained lines, associating a speed vector with each picture point of the retained lines, projecting each picture point of said retained lines according to the speed vector associated therewith, grouping the picture points associated with speed vectors of the same parity together to form at least one picture zone in said first picture, and selecting, for each of said picture zones, one of the sets of lines of picture points of said second picture so as to eliminate picture points approximately corresponding spatially to the projection of points of said first picture.

5. A method for sub-sampling a signal representative of a sequence of electronic non-interlaced pictures in order to obtain a compression of said signal, each picture of the sequence comprising picture points arranged in sets of even-parity columns and odd-parity columns, said method comprising the steps of:

grouping said sequence of pictures into packets of four successive pictures, eliminating two pictures while preserving a first picture and a second picture within each packet, eliminating, in said first picture, either the even-parity columns or the odd-parity columns of the picture points, the columns not eliminated constituting retained columns, associating a speed vector with each picture point of the retained columns, projecting each picture point of said retained columns according to the speed vector associated therewith, grouping the picture points associated with speed vector of the same parity together to form at least one picture zone in said first picture, and selecting, for each of said picture zones, one of the sets of columns of picture points of said second picture so as to eliminate picture points approximately corresponding spatially to the projection of points of said first picture.

6. A method for sub-sampling a signal representative of a sequence of electronic interlaced pictures in order to obtain a compression of said signal, each picture of the sequence comprising the picture points arranged in frames of even-parity lines and odd-parity lines, said method comprising the steps of:

grouping said frames into packets of four successive frames, eliminating the last frame from each packet, associating a speed vector with each picture point of the first frame of each packet, projecting each picture point of said first frame according to the speed vector associated therewith, grouping the picture points associated with speed vectors of the same parity together to form at least one picture zone in said first frame, and selecting, for each of said picture zones, one of either the second frame or the third frame of the packet so as to eliminate picture points approximately corresponding spatially to the projection of points of said first frame.

7. A method for sub-sampling a signal representative of a sequence of electronic interlaced pictures in order to obtain a compression of said signal, each picture of the sequence comprising the picture points arranged in frames of even-parity columns and odd-parity columns, said method comprising the steps of:

grouping said frames into packets of four successive frames, eliminating the last frame from each packet, associating a speed vector with each picture point of the first frame of each packet, projecting each picture point of said first frame according to the speed vector associated therewith, grouping the picture points associated with speed vectors of the same parity together to form at least one picture zone in said first frame, and selecting, for each of said picture zones, one of either the second frame or the third frame of the packet so as to eliminate picture points approximately corresponding spatially to the projection of points of said first frame.

* * * * *